United States Patent [19]

Lederman

[11] Patent Number: 4,722,616
[45] Date of Patent: Feb. 2, 1988

[54] SEALED AND UNITIZED BEARING WITH ECONOMICALLY FORMED RACES

[75] Inventor: Frederick E. Lederman, Sandusky, Ohio

[73] Assignee: General Motors Corporation, Detroit, Mich.

[21] Appl. No.: 929,034

[22] Filed: Nov. 10, 1986

[51] Int. Cl.⁴ .............................................. F16C 33/60
[52] U.S. Cl. .................................... 384/482; 384/501; 384/515
[58] Field of Search ............... 384/482, 501, 515, 460, 384/499, 615, 617

[56] References Cited

U.S. PATENT DOCUMENTS

| | | |
|---|---|---|
| 1,242,582 | 10/1917 | Needham et al. . |
| 2,712,966 | 7/1955 | Brady et al. ........................ 384/460 |
| 2,823,967 | 2/1958 | Harrington . |
| 3,142,520 | 7/1964 | Mueller . |
| 3,800,384 | 4/1974 | Keleshian ...................... 29/148.4 A |
| 4,108,469 | 8/1978 | Schwarzbich ...................... 280/668 |
| 4,118,080 | 10/1978 | Kregler et al. ...................... 384/482 |
| 4,120,543 | 10/1978 | Greene et al. . |
| 4,343,520 | 8/1982 | Bertone ............................. 384/501 |
| 4,362,344 | 12/1982 | Lederman ............................ 384/99 |

FOREIGN PATENT DOCUMENTS 2431935 1/1976 Fed. Rep. of Germany .

Primary Examiner—Lenard A. Footland
Attorney, Agent, or Firm—Patrick M. Griffin

[57] ABSTRACT

A bearing assembly of the type formed from two inner and two outer race members Siamese stamped from flat stock, so that there are annular gaps left between the two pairs of confronting race members. Seal supporting housing members secured to the inner races provide sealed lubricant reservoirs that feed to the ball complement through the annular gaps, and also prevent the outer race members from separating from the inner race members at the annular gaps.

3 Claims, 4 Drawing Figures

SEALED AND UNITIZED BEARING WITH ECONOMICALLY FORMED RACES

This application relates to bearings in general, and specifically to a sealed and unitized ball bearing assembly that has races economically formed from a single blank.

BACKGROUND OF THE INVENTION

In a particularly economical bearing manufacturing technique known generally as "Siamese stamping," bearing races are stamped from a single blank so as to efficiently use the costly bearing quality steel. A central circle, or central annulus, is cut from the blank to be used for the inner race, while the remaining outer annulus is used for the outer race. Essentially the whole blank is used, with very little scrap. The outermost portion of the inner race and the innermost portion of the outer race are stamped or otherwise formed so as to provide radially confronting pathways for a ball complement, and the circular edges of the pathways create a pair of axially spaced annular gaps. It is most economical to stamp the races from thin, flat stock, so the pathways generally conform closely to the ball complement, and there is not a great deal of extra metal to work with in the areas where the pathways are formed. Consequently, the annular gaps do not have the large axial depth that the annular gap between the races of a conventional radial bearing has. There is therefore not sufficient room in the shallow gaps to mount a conventional bearing seal, such as a snap shield. While there is room for a conventional O-ring type seal, using an O-ring does not leave much lubricant containing volume around the ball complement, due to the close conformation of the pathways to the ball complement. Still, the annular gaps must somehow be sealed if the bearing is to be used in a harsh environment, such as a steerable McPherson strut vehicle suspension, with its strong road spray.

Two examples of a bearing manufactured by the above technique may be seen in German Offenlegungsschrift DT 2431935 A1. In the FIG. 2 embodiment, the inner and outer races are single pieces, and the ball complement is conrad assembled between the pathways. Therefore, while it is necessary to somehow seal the annular gaps, it is not necessary to retain the races to each other, as the ball complement itself serves to do that. Often, however, a full ball complement is desirable, especially in limited space, high load applications, like a vehicle suspension. A conrad assembled bearing cannot provide a full ball complement. The FIG. 1 embodiment shown in the above patent does allow a full complement, by bifurcating the inner and outer races. Each inner and outer race is formed from two identical race members. Two blanks of flat stock are each stamped and split along a circle, each blank providing one inner and one outer race member. The ball complement is sandwiched between the two inner and the two outer race members, which are then axially secured together to complete the bearing. This makes it possible to insert a full ball complement. The bifurcated assembly, of course, has the same shallow annular gaps that must be sealed. An additional drawback of the bifurcated structure is that, until the race members are secured together around the ball complement, or bolted to some other structure, there is nothing to prevent them from axially separating at the annular gaps. It is not feasible, in the bifurcated structure, to retain the race members together by radially overlapping the metal of the race member pathways, as the pathways are generally too thin and there is not enough extra metal in that area, as noted above.

A bearing assembly that deals with the problems of sealing and unitization in a bearing assembly having bifurcated races is disclosed in U.S. Pat. No. 4,362,344, assigned to the assignee of the present invention. As disclosed there, the circular edges of the inner race pathway do not radially overlap those of the outer race pathway, but the edges of the inner race member pathways are extended axially to form an axial space. So forming the inner race members is more difficult than just splitting them along a circle, of course, but the axial space in the annular gap is used to advantage. The axial space allows an annular elastomer seal of suitable thickness to be snap fitted into the gaps, filling the axial spaces and sealing the assembly. While the edges of the inner and outer pathways do not overlap one another, they both radially overlap the seal. The inner race members are secured together with separate structure, so the net effect of the pathway-seal overlap is that the outer race members are prevented from axially separating from the inner race members, creating a unitized bearing assembly. However, the strength of that retention can only be as strong as the thickness of the elastomer seal material. Also, the seals are inevitably exposed, sticking radially outwardly from the annular gaps over the outside surfaces of the outer races. Therefore, extra care during shipping and handling, as well as after installation, is necessary to protect the seal. The bearing assembly also has the drawback noted above of a limited lubricant containing volume. This is especially a problem with a full ball complement, as there is almost no circumferential space between the balls to hold lubricant. Therefore, the assembly could not be used in as harsh an environment as it could if it held more lubricant.

SUMMARY OF THE INVENTION

The subject invention provides an improved bearing assembly of the type described above having bifurcated races. The outer race members are retained to the inner races members, prior to installation of the bearing assembly, by housing members that also cooperate to provide a sealed, lubricant containing reservoirs.

The inner race members each have a generally planar flange portion integral with a curvilinear pathway portion. The flange portions are riveted closely together, with the inside surfaces of the pathway portions providing an inner pathway for a full ball complement. The outer race members also each have a generally planar flange portion integral with a curvilinear pathway portion. When the flange portions of the outer race members are secured closely together, which is not done until the bearing assembly is installed to a vehicle suspension, the inside surfaces of their pathway portions provide an outer pathway for the ball complement. Since the pathway portions of the inner and outer thereof radially confront one another, their circular edges create a pair of annular gaps that open axially to the ball complement. Since the pathway portions are curvilinear, the outside surfaces of the outer race member pathway portions slope radially outwardly.

The housing members, also metal stampings, have a generally planar flange portion that is riveted closely to the outside surfaces of the inner race members, inboard of the annular gaps, when the inner race members are riveted together. The inboard side of the annular gaps is thereby sealed. The housing members extend radially over the annular gaps and each has a cylindrical flange that terminates in a circular edge axially spaced by a predetermined amount from the outside surface of a respective outer race member. Consequently, the cylindrical flange edges will prevent the outer race members from axially separating by any more than that predetermined amount, thereby retaining them to the inner race members as a unitary structure.

Each of the housing members also supports a cylindrical elastomer sealing wall, located inboard of the cylindrical flanges where they are protected. When the housing members are secured to the inner race members, these sealing walls are stretched and flexed radially outwardly over the outside surfaces of the pathways portions of the outer race members, which creates a sealing tension. Therefore, the housing members also cooperatively provide a pair of completely sealed lubricant containing reservoirs, one located to either axial side of the ball complement. These reservoirs can hold much more lubricant than can the limited volume available between the ball complement and the closely conformed pathways. Since the housing members extend radially over the annular gaps, lubricant can freely migrate from the reservoirs, axially through the annular gaps and through the ball complement in either direction. Lubricant capacity and flow are both improved over conventional sealing. Excess or pressurized lubricant can also move radially outwardly from the reservoirs by flexing the sealing walls outwardly, which keeps the seals lubricated, drives contaminants out. However, contaminants are denied ingress to the reservoirs, as the seals will not flex in the other direction. Furthermore, a labyrinth seal is cooperatively created by the close gap between the outer race members and the edges of the housing member cylindrical flanges, which also prevents contaminant ingress.

It is, therefore, a general object of the invention to provide a bearing assembly of the type having inner and outer races formed from a pair of inner and a pair of outer race members economically formed from a single blank, in which the outer race members are retained to the inner race members prior to installation without the necessity of securing the outer race members directly together, with the retention provided by housing members secured to the inner race members that also cooperate to create sealed, lubricant retaining reservoirs to improve lubricant capacity and flow.

It is another object of the invention to provide such a sealed and unitized bearing assembly by securing the inner race members together, and then securing the housing members closely to the inner race members inboard of the annular gaps, with the housing members extending radially over the outer race members with a retention portion having a predetermined axial spacing therefrom, and by providing the housing member with a seal that sealingly engages the outer race members outboard of the annular gaps, whereby the outer races are prevented by the retention portion from axially separating from the inner race members by more than the predetermined amount, and the hall complement is thereby surrounded by a pair of sealed lubricant reservoirs from which lubricant can freely migrate through the annular gaps.

It is yet another object of the invention to provide a bearing assembly of the type described in which the retention portion of each housing member is a cylindrical flange, the edge of which is spaced from the outer race so as to create a labyrinth seal, and in which the seal has a cylindrical sealing wall located inboard of the cylindrical flange so as to be protected thereby.

DESCRIPTION OF THE PREFERRED EMBODIMENT

These and other objects and features of the invention will appear from the following written description and from the drawings in which.

Figure 1:
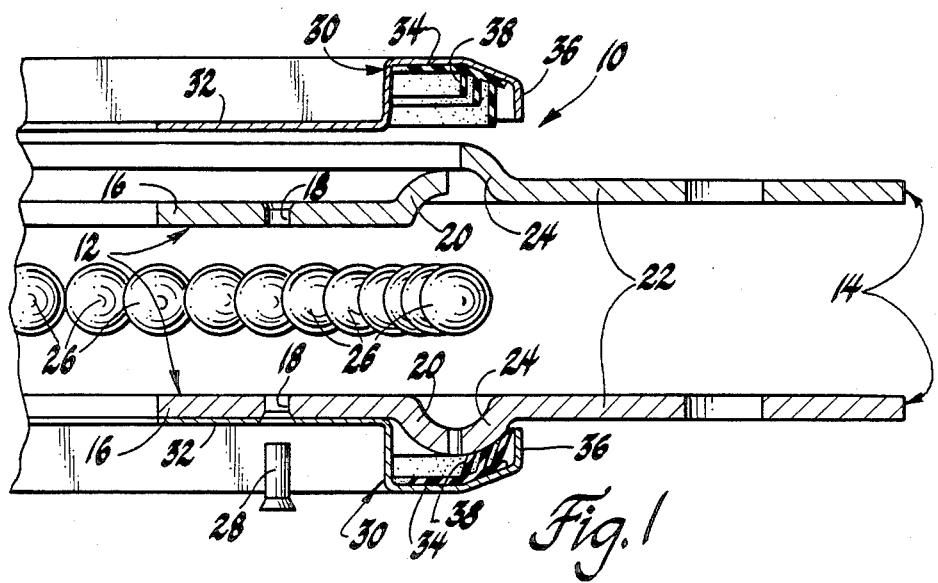
FIG. 1 is a cross sectional exploded view of the preferred embodiment of the invention disassembled.

Referring first to FIG. 1, the preferred embodiment of the bearing assembly of the invention, designated generally at 10, is of the general type described above in which the inner and outer races are bifurcated. The inner race is made up of a pair of identical inner race members, designated generally at 12, and the outer race of a pair of identical outer race members, designated generally at 14. This allows all four of the inner and outer race members 12 and 14 to be economically stamped from only two identical flat blanks of bearing quality steel stock. The inner race members 12 each have a flat flange portion 16 at the interior, provided with a rivet hole 18. Each interior flange 16 is integral with a curvilinear pathway portion 20 stamped at the exterior. Correspondingly, the outer race members 14 each have a flat flange portion 22 at the exterior, integral with an interior curvilinear pathway portion 24. The bearing is assembled by closely abutting the interior flanges 16 then, the lower outer race 14 is held in the FIG. 1 position by a suitable jig, not illustrated, and a full complement 26 of bearing balls is added. Then, the upper outer race 14 is added, and, the inner race member flanges 16 are secured closely together by rivets 28, along with other structure described below, to complete the bearing assembly 10.

Figure 2:
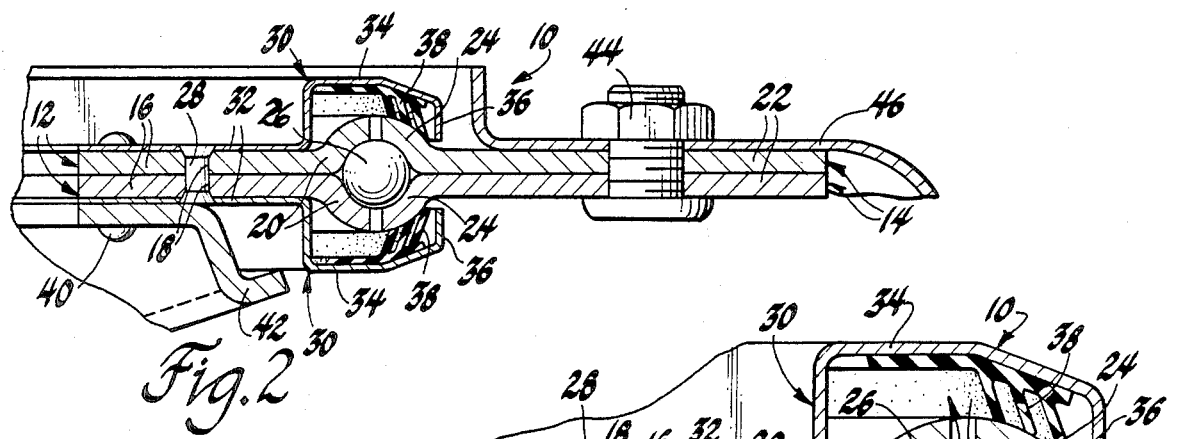
FIG. 2 is a cross sectional view of the preferred embodiment after installation.
Figure 3:
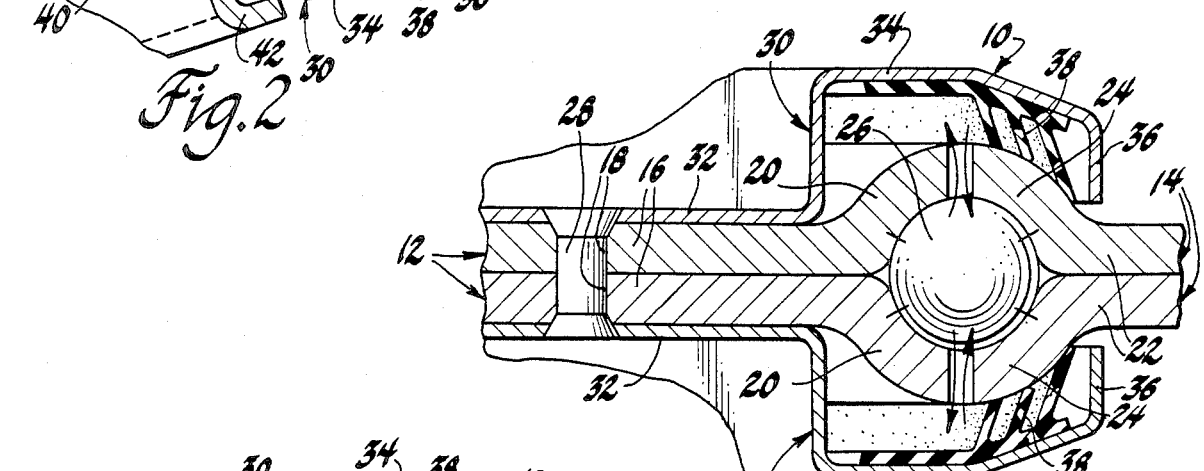
FIG. 3 is an enlarged portion of FIG. 2.

Referring next to FIGS. 2 and 3, the outer race flanges 22 are not secured together until the bearing assembly 10 is installed, nor need they be, as will appear. In the installed bearing assembly 10, the inside surfaces of the pathway portions 20 and 24 radially confront one another and make four point angular contact with the ball complement 26, as shown by the diagonal lines. Because of the way the race members 12 and 14 are stamped and parted, however, the circular edges of the confronting pathway portions 20 and 24 create annular gaps that open axially to the ball complement 26. Without some sort of seal, therefore, lubricant could not retained around the ball complement 26. Another result of the way the outer race members are stamped is that the outside surfaces of the pathway portions 24 slope radially outwardly, away from the annular gaps. That fact is used to advantage in the sealing provided by the invention. Furthermore, a seal is provided in such a way as to also cooperatively retain the outer race members 14 to the inner race members 12 prior to installation, as will appear below.

Referring next to FIGS. 1 and 3, sealing is provided by a pair of housing members, designated generally at 30. Each housing member 30 is a thin metal stamping with a flat interior mounting flange 32 that matches the inner race member flanges 16 in size. Integral with the flange 32 is an annular trough-shaped portion 34, which is integral with an outermost cylindrical flange 36. Supported inboard of the cylindrical flange 36 is a cylindrical three walled elastomer seal 3B having a stepped configuration that generally matches the curved, sloping shape of the outside surfaces of the outer race member pathway portions 24. Seal 38 may be molded or bonded to the inner surface of trough-shaped portion 34. When the inner race member flange portions 16 are riveted together as described above, the housing member flanges 32 are closely secured thereto by the same rivets 28. The close engagement of the housing member flanges 32 with the outside of the inner race member flanges 16 seals the inboard side of the annular gaps. Of course, no lubricant can escape between the inside surfaces of the inner race flange portions 16, once they are tightly riveted together. The housing members 30 extend radially over the annular gaps and over the outer race members 14 far enough that the three walls of seal 38 are flexed radially outwardly and stretched over the outside surfaces of the outer race pathway portions 24, creating a good sealing tension. The seals 38 and the trough-shaped portions 34 thus create sealed lubricant reservoirs to either axial side of the ball complement 26, which are filled with a suitable grease, not illustrated. The lubricant reservoirs hold much more lubricant than would be available if the annular gaps were simply filled with an O-ring.

Referring next to FIGS. 2 and 3, after the housing members 30 are mounted, the bearing assembly 10 is installed to a steerable McPherson strut suspension. The secured inner race members 12 are joined by rivets 40 to a support 42 located at the top of an air damper, not illustrated. The outer race flanges 22 are secured tightly together by attaching them with a nut and bolt 44 to a suspension spring tower 46. With all four flanges 16 and 22 held tightly together, and with the seals 38 in sealing tension with the outside surfaces of the outer race pathway portions 24, grease around the ball complement 26 is prevented from escaping in any direction. As the bearing assembly 10 operates, the annular gaps are actually used to advantage, as they provide free access for grease from the reservoirs axially into and through the ball complement 26 in both directions, as shown by the arrows in FIG. 3. Because of the way the walls of the seal 38 slope, excess or heat pressurized lubricant can move radially outwardly from the reservoirs, by flexing the seal 38 away from the outside surface of outer race member pathway portions 24. This serves to fill the spaces between the walls of the seal 38, lubricating the seal 38 as well as driving contaminants out. However, contaminants moving in the other direction would drive the walls of the seal 38 more strongly into the sloping pathway portions 24, and would be denied ingress to the reservoirs. The terminal edges of the cylindrical flanges 36 also create a non-rubbing labyrinth seal in cooperation with the outer race members 14, and prevent large contaminants from ever reaching the seal 38. This extra measure of lubricant capacity and flow, and extra sealing capacity and protection, is particularly important in the harsh environment of a vehicle suspension.

Figure 4:
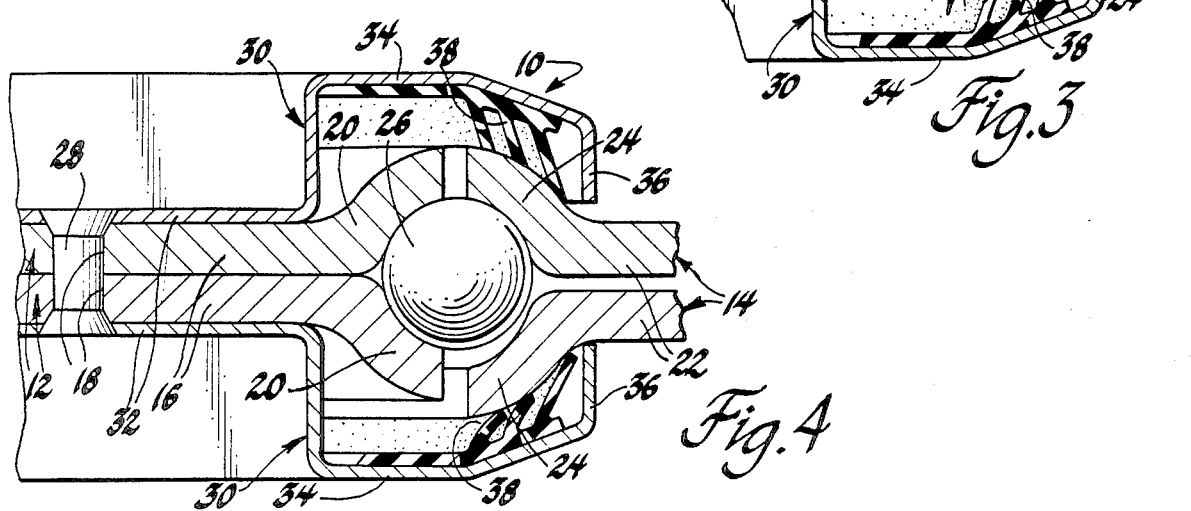
FIG. 4 is an enlarged cross sectional view of a portion of the preferred embodiment before installation.

Referring next to FIG. 4, the same housing members 30 also cooperate to retain the outer race members 14 to the inner race members 12 as a unitary structure prior to installation. The outer race members 14 can axially separate by no more than the predetermined axial clearance referred to above, before they hit the edges of the cylindrical flanges 36. FIG. 4 illustrates the lower outer race member 14 falling under the force of gravity. The seal 38 is simply flexed down to a small extent, and is not damaged. The retention force is not dependent on the strength of seal 38, and is as strong as the metal housing member 30. No extra structure is needed to keep the outer race members 14 together. The cylindrical flanges 36 also protect the seals 38 during shipping and handling. While some grease can move between the outer race member flanges 22 when they separate by the controlled amount shown, there is more grease in the reservoirs, and the grease is under no pressure during shipping. Any escaped grease would not move radially outwardly very far, and much of what did would be squeezed radially inwardly back into the ball complement 26 at such time as the outer race member flanges 22 were bolted together at installation.

Variations of the preferred embodiment disclosed could be made within the spirit of the invention. The cylindrical flanges 36 could be replaced with some other retention structure, such as tabs extending toward the planar flanges 22. The outer race members 14 would still be prevented from axially separating beyond the controlled amount. However, the cylindrical flanges 36 are desirable because the provide the labyrinth seal, as well as protection for seal 38. A seal other than the cylindrical walled seal 38 could be used, but the particular seal 38 disclosed is advantageous because of its slope, and its multi-walled construction provides additional sealing security and capacity. Therefore, it will be understood that the invention is not intended to be limited to the exact embodiment disclosed.

The embodiments of the invention in which an exclusive property or privilege is claimed are defined as follows:

1. A sealed and unitized ball bearing assembly having economically formed races, comprising, a bearing ball complement, a pair of inner race members, each having a generally planar flange portion integral with a pathway portion, said flange portions adapted to be secured closely together so that the inside surfaces of said pathway portions provide an inner pathway for said ball complement, a pair of outer race member, each having a generally planar flange portion integral with a pathway portion, said flange portions adapted to be secured closely together so that the inside surfaces of said pathway portions provide an outer pathway for said ball complement, each pair of inner and outer race members being formed from a single blank so that the pathway portions thereof radially confront one another to create a pair of annular gaps opening to said ball complement, a pair of housing members, each of said housing members having a generally planar flange portion adapted to be secured closely to the outside surfaces of said inner race members inboard of said annular gaps as said inner race members are secured together, thereby sealing the inboard side of said annular gaps, said housing members also extending radially over said annular gaps and having a retention portion axially spaced from the outside surfaces of said outer race members by a predetermined amount, whereby, after said inner race members are secured together, but before said outer race members are secured together, said housing member retention portions will engage the outer surfaces of said outer race members to prevent them from axially separating by more than said predetermined amount, thereby retaining said outer race members to said inner race members as a unitary structure, each of said housing members also supporting a seal that engages the outside surfaces of said outer race members outboard of said annular gaps, so that, after said outer race members are also secured together, said housing members, retention members, in cooperation with said closely secured race member flanges, form a pair of completely sealed lubricant containing reservoirs surrounding said ball complement and communicating with said annular gaps, whereby lubricant in said reservoirs may freely migrate through said annular gaps to said ball complement.

2. A sealed and unitized ball bearing assembly having economically formed races, comprising, a bearing ball complement, a pair of inner race members, each having a generally planar flange portion integral with a pathway portion, said flange portions adapted to be secured closely together so that the inside surfaces of said pathway portions provide an inner pathway for said ball complement, a pair of outer race members, each having a generally planar flange portion integral with a pathway portion, said flange portions adapted to be secured closely together so that the inside surfaces of said pathway portions provide an outer pathway for said ball complement, each pair of and outer race members being formed from a single blank so that the pathways portions thereof radially confront one another to create a pair of annular gaps opening axially to said ball complement, a pair of housing members, each of said housing members having a generally planar flange portion adapted to be secured closely to the outside surfaces of said inner race members inboard of said annular gaps as said inner race members are secured together, thereby sealing the inboard side of said annular gaps, said housing members each also having a generally annular portion extending radially over said annular gaps and a generally cylindrical flange terminating in an edge axially spaced from the outside surfaces of said outer race members by a predetermined amount, whereby, after said inner race members are secured together, but before said outer race members are secured together, said cylindrical flange edges will engage the outside surfaces of said outer race members to prevent them from axially separating by more than said predetermined amount, thereby retaining said outer race members to said inner race members as a unitary structure, each of said housing members also supporting a seal inboard of said cylindrical flanges that engages the outside surface of said outer race members outboard of said annular gaps, so that, after said outer race members are also secured together, said housing members, in cooperation with said closely secured race member flanges, form a pair of completely sealed lubricant containing reservoirs surrounding said ball complement and communicating with said annular gaps, whereby lubricant from said reservoirs may freely migrate axially through said annular gaps to said ball complement, said cylindrical flanges protecting said seals as well as cooperating with the outside surfaces of said outer race members to create a labyrinth seal to prevent the ingress of contaminants to said reservoirs.

3. A sealed and unitized ball bearing assembly having economically formed races, comprising, a bearing ball complement, a pair of inner race members, each having a generally planar flange portion integral with a pathway portion, said flange portions adapted to be secured closely together so that the inside surfaces of said pathway portions provide an inner pathway for said ball complement, a pair of outer race members, each having a generally planar flange portion integral with a curvilinear pathway portion the outside surface of which slopes radially outwardly of said ball complement, said flange portions adapted to be secured closely together so that the inside surfaces of said pathway portions provide an outer pathway for said ball complement, each pair of and outer race members being formed from a single blank so that the pathways portions thereof radially confront one another to create a pair of annular gaps opening axially to said ball complement, a pair of housing members, each of said housing members having a generally planar flange portion adapted to be secured closely to the outside surfaces of said inner race members inboard of said annular gaps as said inner race members are secured together, thereby sealing the inboard side of said annular gaps, said housing members each also extending radially over said annular gaps and having a generally cylindrical flange terminating in an edge axially spaced from the outside surfaces of said outer race members by a predetermined amount, whereby, after said inner race members are secured together, but before said outer race members are secured together, said cylindrical flange edges will engage the outside surfaces of said outer race members to prevent them from axially separating by more than said predetermined amount, thereby retaining said outer race members to said inner race members as a unitary structure, each of said housing members also supporting a generally cylindrical elastomer seal inboard of said cylindrical flanges that engages the outside surfaces of said outer race member curvilinear pathway portions and is flexed radially outwardly into sealing tension therewith, so that, after said outer race members are also secured together, said housing members, in cooperation with said closely secured race member flanges, form a pair of completely sealed lubricant containing reservoirs surrounding said ball complement and communicating with said annular gaps, whereby lubricant from said reservoirs may freely migrate axially through said annular gaps to said ball complement or radially outwardly from said reservoirs by flexing said sealing walls radially outwardly away from said outer race member curvilinear pathway portions, whereas contaminants are denied ingress to said reservoirs both by a labyrinth seal cooperatively created by the outside surfaces of said outer race members and the edges of said cylindrical flanges and also by the fact that said seal cannot be flexed radially inwardly past said outer race member curvilinear pathway portions.

* * * * *